July 23, 1940.    H. J. G. RUDOLF    2,208,817
LIQUID-LEVEL INDICATOR
Filed June 7, 1938

Inventor:
Henry J. G. Rudolf.
By Roberts, Cushman & Woodberry.
his Attys.

Patented July 23, 1940

2,208,817

UNITED STATES PATENT OFFICE 2,208,817

LIQUID-LEVEL INDICATOR

Henry J. G. Rudolf, Galesburg, Ill., assignor, by direct and mesne assignments, to The Applied Mechanics Co., Wellesley, Mass., a corporation of Massachusetts Application June 7, 1938, Serial No. 212,267

4 Claims. (Cl. 73—321)

This invention relates to liquid-level indicators of the type having a casing adapted to be mounted in a restricted opening in the top of a tank with a drum or other pulley in the casing, a tape or other cable extending from the pulley through the aforesaid opening to a float in the tank, and a spring for winding the tape on the drum as the liquid-level rises in the tank, the drum controlling an indicator calibrated in terms of liquid measure. Owing to the notorious tendency of such devices to get out of order it is desirable to test the indicators from time to time to make sure they are in proper working order.

Objects of the present invention are to provide, in indicators of the type referred to, test means which is manually operable without removing the indicator from the aforesaid opening and without opening the aforesaid casing, which is accessible for quick and facile testing, which is proof against misuse in such a way as to displace the aforesaid tape from the aforesaid drum, which is simple and economical in construction, which is durable and reliable in use and which is generally superior to testing devices heretofore proposed.

According to this invention the test means is kinematically connected to the aforesaid drum, as by a one-way clutch, to rotate the drum only in the direction to wind the tape on the drum, whereby the float may be lifted from and dropped to the liquid to test the operation of the indicator without the danger of displacement of the tape from the drum incident to manually turning the drum in the opposite direction. Preferably the shaft or axle upon which the drum is mounted is extended outside the casing and the test means comprises a knurled knob or other handle fitted over the outer end of the axle with an annular space between the handle and axle and a spiral spring closely surrounding the axle in the annular space, one end of the spring being anchored to the handle, so that the spring grips the shaft with a snubbing action when the handle is turned in the direction to wind the tape on the drum.

For the purpose of illustration a typical embodiment of the invention is shown in the accompanying drawing in which, Fig. 1 is an elevation of the device mounted in a tank;

Figure 1:
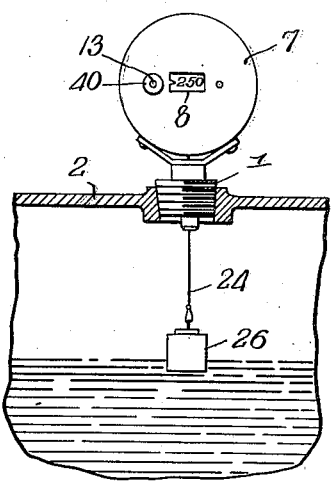

The particular embodiment of the invention chosen for the purpose of illustration comprises a plug 1 adapted to thread into an opening in the top of a tank such as shown at 2, a cup-shaped casing 3 mounted on the plug by means of a strap saddle 4 and bolts 5 and a tube 6 fast in an opening in the plug 1 with its upper end flanged outwardly over the periphery of an opening in the strap 4, and a cover 7 telescoping over the open end of the cup-shaped casing 3, the cover 7 having a window 8 through which to read the indication of the indicator inside the casing.

Figure 2:
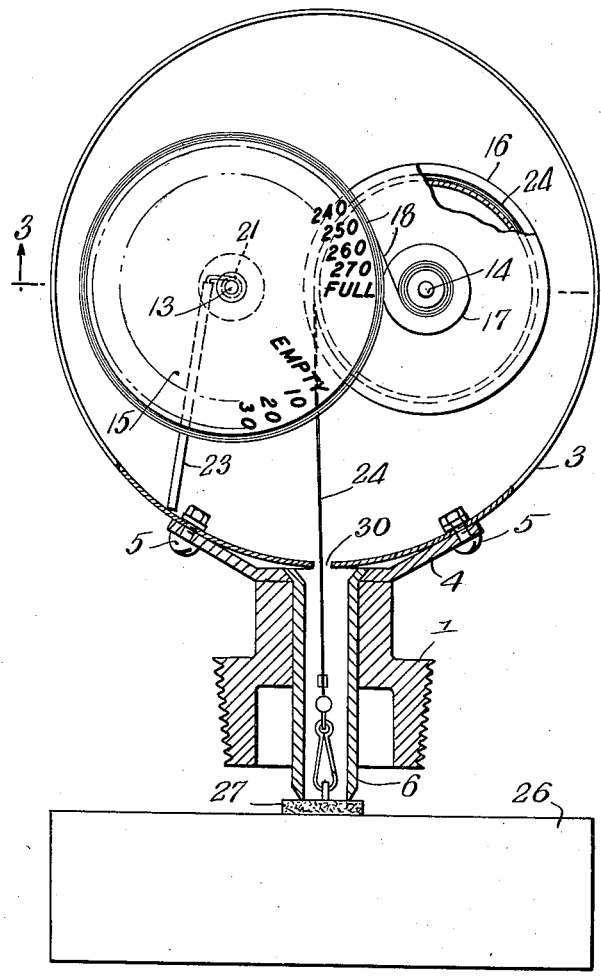
Fig. 2 is an enlarged vertical cross-section.
Figure 3:
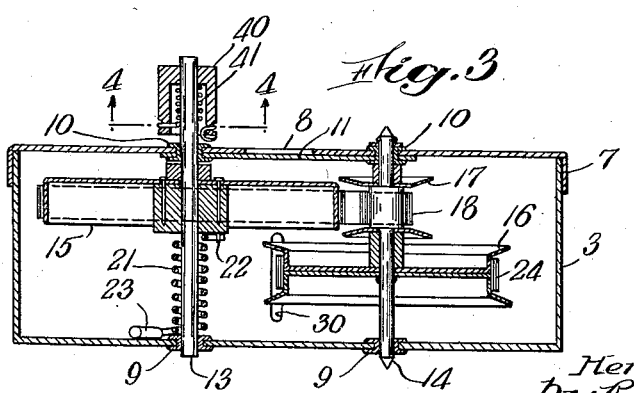
Fig. 3 is a horizontal section on line 3—3 of Fig. 2.

As shown in Fig. 3 the casing is provided with small openings containing eyelet bearings 9 and 10, the eyelets 10 also serving to hold the transparent covering 11 over the window 8. Pivotally mounted in the bearings 9 and 10 are two axles 13 and 14. Fast to the axle 13 is a large drum 15 and fast to the axle 14 are two drums, a large drum 16 and a small drum 17, the latter drum being in alignment with the drum 15. The drums 15 and 17 are interconnected by a thin metallic belt 18, the opposite ends of which are secured to the two drums respectively. A coil spring 21 surrounds the axle 13 with one end secured to the drum 15 as indicated at 22 and the other end 23 engaging the casing, the spring tending to rotate the drum 15 in a counter-clockwise direction (Fig. 2).

A second tape 24 is wound upon the periphery of the drum 16 with its free end extending downwardly through a guide slot 30 in the periphery of the casing 3 and anchored to the float 26 which carries a valve 27 of cork or other suitable material adapted to seat against the lower end of the tube 6 when the tank is filled. The float, which is preferably formed of wood, has the same square cross-section throughout its length, whereby the wetted perimeter of the float is always the same irrespective of the depth to which the float is submerged in the liquid. Fig. 1 shows the float in end elevation and Fig. 2 in side elevation.

The tapes 18 and 24 are preferably formed of beryllium copper which is unique in having all the desirable characteristics for this purpose without any of the disadvantages of other materials. Tapes of beryllium copper may be formed very thinly without danger of breaking or becoming permanently deformed; they are hard and springy but not brittle and they are non-corrosive.

The pulley 15 carries the dial indications on its front side as indicated in Figs. 1 and 2, these indications preferably being printed on the sheet metal before it is shaped into the form of a cup. As shown in Fig. 3 the drum 16 preferably comprises two cup-shaped sheet-metal parts secured together bottom to bottom, these parts resembling can covers and preferably being formed in the same way.

As shown in Fig. 3 the axle 13 projects through the cover 7 and a knurled handle 40 is associated with the outer end of the axle, whereby the interior mechanism may be actuated to test the operability of the device. For example, by turning the handle 40 counter-clockwise the float may be lifted above the liquid and then permitted to drop back. If the indicator returns to its former position the operator knows that the device is functioning properly.

Figure 4:
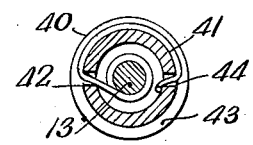
Fig. 4 is a section on line 4—4 of Fig. 3.

According to the present invention the handle is interconnected with the axle 13 so as to turn the axle in one direction only. Thus the float may be lifted and dropped to test the instrument but the drums may not be rotated in the reverse direction, which would unwind and displace the tapes from the drums. In the preferred embodiment the handle 40 is cup-shaped and a spiral spring 41 closely surrounds the axle in the annular space between the handle and axle. One end of the spring is anchored to the handle and the spring spirals along the shaft in the direction to grip the shaft when the handle is turned in the direction to wind the tape 18 on the drum 15, the spring turning freely on the shaft when the handle is turned in the reverse direction. Preferably the spring is anchored to the handle so as to remain approximately in alignment with the handle when the latter is removed from the axle. As shown in Figs. 3 and 4 this is accomplished by extending one end of the spring outwardly through an opening 42, thence along an annular groove 43 and thence back into the handle through an opening 44, whereby the spring remains approximately coaxial with the handle when the latter is removed from the axle. The handle may be pushed on or pulled off the shaft merely by slowly turning the handle clockwise while pushing or pulling.

When the liquid-level in the tank 2 is falling the float 26 gradually settles downwardly, thereby unwinding the tape 24 from the drum 16, turning the drums 16 and 17 in a counter-clockwise direction (Fig. 2), winding the tape 18 from the drum 15 to the drum 17, and turning the drum 15 in a clockwise direction (Fig. 2) against the action of the spring 21. During the rise of liquid-level the action is reversed, the spring 21 keeping the tapes taut. Of course the parts are so correlated that when the float 26 is in the upper position shown in Fig. 2 the "Full" indication on the drum 15 shows through the window 8 and when the float 26 rests on the bottom of the tank the word "Empty" shows through the window.

I claim:

1. A liquid-level indicator comprising a casing, an axle journaled in the casing with one end projecting outside the casing, a pulley fast to the axle inside the casing, a float outside the casing, means for kinematically interconnecting the pulley and float including a cable wound on the pulley, a handle rotatably mounted on said end of the axle, and a spiral spring closely surrounding said axle with one end anchored to the handle to turn the pulley only in the direction to wind the cable on the pulley, whereby the float may be lifted from and dropped to the liquid to test the operation of the indicator without the danger of displacement of the cable from the pulley incident to manually turning the pulley in the opposite direction.

2. A liquid-level indicator comprising a casing, an axle journaled in the casing with one end projecting outside the casing, a pulley fast to the axle in the casing, a float outside the casing, means for kinematically interconnecting the pulley and float including a cable wound on the pulley, a handle surrounding said end of the axle with an annular space between the handle and axle, and a spiral spring closely surrounding the axle in said annular space with one end of the spring anchored to the handle to rotate the axle, by a frictional gripping action, only in the direction to wind the cable on the pulley, whereby the float may be lifted from and dropped to the liquid to test the operation of the indicator without the danger of displacement of the cable from the pulley incident to manually turning the pulley in the opposite direction.

3. A liquid-level indicator comprising a casing, an axle journaled in the casing with one end projecting outside the casing, a float outside the casing, means for kinematically interconnecting the axle and float including a pulley and a cable wound on the pulley, a rotor rotatably mounted on said end of the axle, and a spiral spring closely surrounding said axle with one end anchored to the rotor to turn the pulley only in the direction to wind the cable on the pulley, whereby the float may be lifted from and dropped to the liquid to test the operation of the indicator without the danger of displacement of the cable from the pulley incident to manually turning the pulley in the opposite direction.

4. A liquid-level indicator comprising a casing, an axle journaled in the casing with one end projecting outside the casing, a float outside the casing, means for kinematically interconnecting the axle and float including a pulley and a cable wound on the pulley, a rotor surrounding said end of the axle with an annular space between the rotor and axle, and a spiral spring closely surrounding the axle in said annular space with one end of the spring anchored to the rotor to rotate the axle, by a frictional gripping action, only in the direction to wind the cable on the pulley, whereby the float may be lifted from and dropped to the liquid to test the operation of the indicator without the danger of displacement of the cable from the pulley incident to manually turning the pulley in the opposite direction.

HENRY J. G. RUDOLF.